J. TYLER.
Hay-Unloader.
No. 223,082. Patented Dec. 30, 1879.
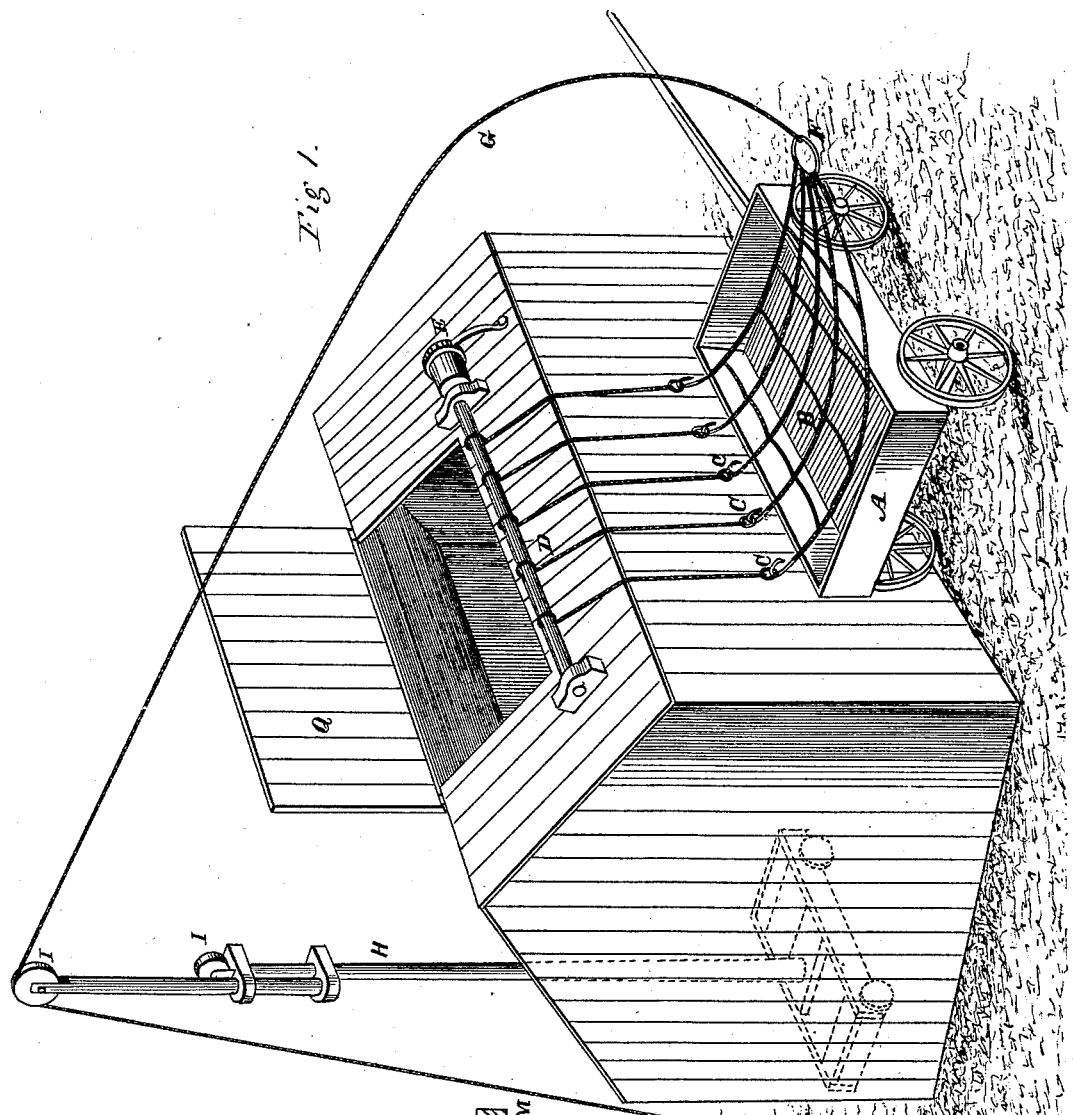
WITNESSES
F. A. Brooks
J. Srouse
INVENTOR
Jerry Tyler
By Dewey & Co.
Attys
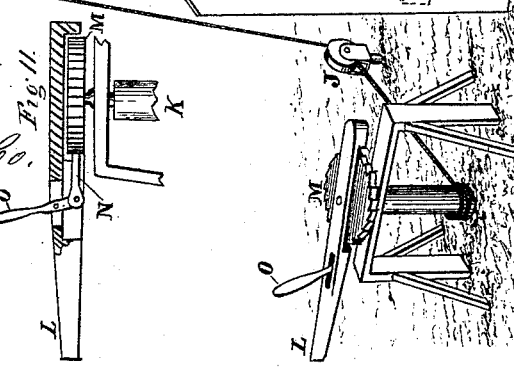

UNITED STATES PATENT OFFICE.

JERRY TYLER, OF MILFORD, CALIFORNIA.

IMPROVEMENT IN HAY-UNLOADERS.

Specification forming part of Letters Patent No. 223,082, dated December 30, 1879; application filed November 8, 1879.

*To all whom it may concern:*

Be it known that I, JERRY TYLER, of Milford, county of Lassen, and State of California, have invented a Device for Unloading and Depositing Hay and Grain; and I hereby declare the following to be a full, clear, and exact description thereof.

My invention relates to certain improvements in devices and apparatus for unloading and storing hay or straw into barns and other places of deposit, as will be more fully described by reference to the accompanying drawings, in which—

Figure I is a view of my apparatus, showing its application to filling a barn. Fig. II is a detail referred to.

The methods ordinarily employed for unloading and stacking hay and grain are, first, the employment of two-part nets, which lie in the wagon and receive the load. These nets are elevated bodily with their load by the aid of a derrick, and swung around to the place of deposit, when the fastenings are unlatched and the net allowed to part and drop the load.

The second method is shown in Patent No. 188,374, issued March, 1877, to Geo. F. Kelley; and it consists in connecting one side of the wagon-net (which is made entire) with an unloading-rope and pulleys, so that the load is rolled out of the wagon instead of being lifted, and thus much power is saved which was used in the first-described method to lift the load.

This method, which will serve to unload grain upon the table of a thrashing-machine, or upon a low platform or stack, cannot be employed to advantage in filling a barn or in building high stacks without the aid of other apparatus, such as the inclined railway and truck of Kelley, or by means of additional ropes or nets, which will allow the load to be rolled over and over until it reaches the top of the stack. This latter plan can only be employed in building outdoor stacks of limited height, because the friction of dragging the rope and load up and over the side of the stack is too great for practical work.

My invention consists in the employment of a mast or support having pulleys and hoisting-ropes which are operated by a windlass, in combination with a continuous wagon-net which is adapted to receive the load, and which may be connected with the hoisting-ropes when the wagon is brought to the barn or place of deposit, so as to roll the load up to any height desired without undue friction or pressure upon the side of the barn or stack. In combination with this I employ a roller or pulleys, which are connected with the inner edge of the net, and by which sufficient tension may be brought upon the net to prevent the overturning of the wagon by the action of rolling the load out.

A is a wagon-body of any suitable shape to receive and convey the load of hay, straw, or other material. Within this body is placed the continuous net or hammock B, which is large enough to receive the load, while the ends hang over the sides. The inner end has a number of hooks, loops, or rings, C, by which it may be connected with corresponding ropes that lead to the roller or pulley D, situated above the wagon and load, as shown. This is provided with a ratchet and pawl, E, or with any holding device, and it serves to draw upon the net until a certain tension is produced. As this tension is in an upward direction, it relieves the wagon from side strain when the load commences to roll out, and I am thus enabled to dispense with stakes and steadying-ropes, which must otherwise be used to prevent the wagon from overturning.

The outer end of the net has ropes connected with it, or forming extensions of it, which converge to a single loop or ring, F. The hoisting-rope G extends from this ring to the head of the mast or other support H, where it passes over a pulley, I, extending thence to a lead-pulley, J, upon the ground or floor of the barn. From this pulley it passes to a capstan, K, around which it is coiled by horse or other power, so as to roll the load up to the point of delivery.

In the present case I have shown my capstan provided with a lever or pole, L, to the outer end of which a horse may be attached, so as to actuate the capstan and haul up the load. A ratchet, M, is fixed to the head of the capstan, and a pawl, N, is made to engage with this ratchet at will by means of a lever, O, which passes through the arm or pole L, as shown. When the rope is to be wound upon the capstan to raise the load, the pawl is caused to engage with the teeth of the ratchet until the load has been raised and deposited. The lever O is then thrown back, and the ratchet and capstan will be left free to revolve, when the rope will uncoil, and the net may be returned to its place in the wagon, while the rope will be ready for the next load.

I have shown my invention as applied to filling a barn with hay. This barn has a hinged door, Q, which turns up, and its edge serves as a guide over which the ropes of the net pass, thus keeping the net open, preventing the ropes from becoming tangled, and insuring the discharge of the hay or straw after it is rolled up to the opening of the door.

If a derrick or mast be employed to support the pulleys I, it may be mounted upon a sled or truck, as shown, and it may have an extension-mast, so that it can be extended and the pulleys raised to any desired height.

By this construction I am enabled to build stacks with a comparatively narrow base and very high, so that they present but a small area to be protected from the weather. When a barn is to be filled by my apparatus it can be filled entirely full, as no portion of the apparatus is placed within the barn, or at such a point as to interfere with the work of filling, although the pulley I may sometimes be supported by a beam at some high point on the barn, and this would then take the place of the mast or other support.

The most important point gained by my invention is the power to roll the load up to any height without undue loss of power by friction or lifting the load, and this I effect by the combination of the extension rolling netting with the mast and elevated pulley and the tension-roller.

Having thus described my invention, what I claim as new, and desire to secure by Letters Patent, is—

1. The continuous wagon net or hammock B, having the inner end connected with a tension-roller, D, while the other end is connected with the hoisting-rope G, in combination with the mast H, elevated pulley I, and the capstan or other power K, whereby the load may be rolled to a height and the strain taken from the wagon, substantially as herein described.

2. The continuous wagon-net B, having the ropes at the outer end converging and united to the ring F, so that the single hoisting-rope G will control it, while the inner end is adapted to be connected with the ropes of a tension-roller, D, whereby the inner edge of the net may be raised, substantially as and for the purpose herein described.

3. The continuous wagon-net B, with its inner edge adapted to be drawn upward by the tension-roller D, and its outer edge connected with and operated by the rope G, passing over the elevated pulley I, in combination with the direction-pulley, the capstan K, ratchet M, pawl N, and lever O, whereby the net may be rolled up and discharged, and then released so as to fall back, substantially as herein described.

4. The wagon-net B, adapted to be connected with the elevated tension-roller D and with the exterior hoisting-rope, G, which passes over the elevated pulley I, in combination with the door Q, whereby the net is guided and kept open and the load is discharged into the barn, substantially as herein described.

In witness whereof I have hereunto set my hand.

JERRY TYLER.

Witnesses:
 GEO. H. STRONG,
 S. H. NOURSE.